(12) United States Patent
Askinger et al.

(10) Patent No.: US 6,728,207 B1
(45) Date of Patent: Apr. 27, 2004

(54) SELF-HEALING RING NETWORK AND A METHOD FOR FAULT DETECTION AND RECTIFYING

(75) Inventors: Tomas Askinger, Norsborg (SE); Bengt Johansson, Hägersten (SE); Nigel Wood, Northants (GB)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/462,466

(22) PCT Filed: Jun. 10, 1998

(86) PCT No.: PCT/SE98/01118

§ 371 (c)(1),
(2), (4) Date: Apr. 10, 2000

(87) PCT Pub. No.: WO99/03230

PCT Pub. Date: Jan. 21, 1999

(30) Foreign Application Priority Data

Jul. 11, 1997 (SE) ................................................ 9702685

(51) Int. Cl.$^7$ ............................................. H04L 12/437
(52) U.S. Cl. ........................ 370/224; 370/217; 370/404
(58) Field of Search ................................. 370/216–228, 370/242–245, 248–250, 400–406

(56) References Cited

U.S. PATENT DOCUMENTS

| | | | |
|---|---|---|---|
| 5,113,459 A | 5/1992 | Grasso et al. ................... 385/24 |
| 5,179,548 A | 1/1993 | Sandesara .................... 370/16.1 |
| 5,307,353 A | * 4/1994 | Yamashita et al. ........... 370/224 |
| 5,365,510 A | 11/1994 | Nicholson et al. ............. 370/16 |
| 5,442,623 A | * 8/1995 | Wu ............................... 370/224 |
| 5,469,428 A | * 11/1995 | Tokura et al. ................ 370/224 |
| 5,546,403 A | * 8/1996 | Yamamoto et al. .......... 714/716 |
| 6,442,694 B1 | * 8/2002 | Bergman et al. ............. 713/201 |
| 6,535,990 B1 | * 3/2003 | Iterum et al. .................... 714/4 |

FOREIGN PATENT DOCUMENTS

| | | |
|---|---|---|
| EP | 0 525 399 A2 | 2/1993 |
| EP | 0 677 936 A1 | 10/1995 |
| GB | 2 287 596 A | 9/1995 |
| WO | WO96/19884 | 6/1996 |
| WO | WO96/32787 | 10/1996 |

OTHER PUBLICATIONS

Johansson, B.S., et al., Electronic Letters, 5$^{th}$ Dec. 1996, vol. 32, No. 25, pps. 2338–2339, Flexible bus: A self–restoring optical ADM ring architecture.

* cited by examiner

*Primary Examiner*—Chi Pham
*Assistant Examiner*—Thai Hoang

(57) ABSTRACT

The present invention relates to a self-healing ring network and a method for fault handling in said network. Said network comprises two communication paths (1, 2) and at least two nodes (N1, N2, N3, N4, N5). A first node (N1) and a second node (N5) suppress transmission to and/or reception from a segment (IS) in the ring, called an inactive segment. In the case of an occurring fault, the inactive segment is moved to the fault. According to the invention the network comprises a separate supervisory channel (OSC) for transmitting information of the fault between the nodes (N1, N2, N3, N4, N5) of the network, in which supervisory channel (OSC) a fault flag (ASSERT_PSS) is provided for the indication of the fault.

11 Claims, 7 Drawing Sheets

SELF-HEALING RING NETWORK AND A METHOD FOR FAULT DETECTION AND RECTIFYING

TECHNICAL FIELD OF THE INVENTION

The present invention relates to a self-healing ring network and a method for fault detection and rectifying in said network.

DESCRIPTION OF RELATED ART

Wave Division Multiplexing (WDM) is a technology allowing the transmission of a number of optical signals through an optical fibre using different separated light wavelengths. In this way the information carrying capacity may be increased significantly. The capacity depends on the number of used wavelength channels and their bandwidth. The signal at each wavelength travels through the fibre irrespectively of the other signals, so that each signal represents a discrete channel with large bandwidth.

A ring communication network is made up of nodes that are connected in tandem in a ring by a unidirectional communication path, such as an optical fibre. A node receives transmissions from an upstream node. The return traffic is transmitted downstream to the first node A drawback of such a network is that a break in the ring or a failure of a node would prevent any node upstream of the break/failure of communicating with any node downstream of the break. A usual solution to this problem is to in some way providing a second spare communication path parallel to the first, but in the opposite direction, see U.S. Pat. No. 5,365,510, U.S. Pat. No. 5,179,548 and EP 677,936. If communication fails somewhere on the first communication path, then the traffic is directed back on the second communication path and the wished node will thus be reached from the other side.

Another solution is to send traffic on two communication paths in opposing directions, but with a segment of the ring inactivated for data traffic, see "Electronic letters", Dec. 5th 1996, Vol.32, No 25, p 2338 –2339, B. S. Johansson, C. R. Batchellor and L. Egnell: "Flexible bus: A self-restoring optical ADM ring architecture". In the case of a fault the segment is moved to the fault. It is however not described how to achieve this in practise.

In U.S. Pat. No. 5,113,459 is shown an idea of using a special channel for optical service signalling.

SUMMARY

The purpose with the present invention is to solve the problem of a practical implementation of the self-healing ring network described in "Electronic letters", Dec. 5th 1996, Vol.32, No 25, p 2338 –2339, B. S. Johansson, C. R. Batchellor and L. Egnell: "Flexible bus: A self-restoring optical ADM ring architecture", which hereby is incorporated by reference. A ring network will be called "ring" for short.

The present invention transmits in WDM channels on two communication paths in opposing directions at the same time, but with an inactive segment on the ring, which prevents nodes on the ring from receiving traffic from more than one direction at the time. In the case of a fault, the inactive segment is moved to the fault.

The problem of accomplishing an inactive segment may be solved by using switches in the nodes, but a more economic and reliable way is to use amplifiers in the node, which are needed anyway, as switches. The switching means block transmission towards or reception from the segment of the ring that is an inactive segment. An advantage of blocking reception instead of transmission is that signals is then present at the input of the node. The signals may then for example be used for controlling the gain of a switched off amplifier, so that the amplifier has the proper gain when it is switched on again. It will also make it easier to discover a fault in the inactive segment.

The problem of how to signal when and how to move the inactive segment is solved via a supervisory channel on a wavelength separated from the data traffic channels. The supervisory channel never really enters the node, but is received and retransmitted outside the main parts of the node. The advantages with that is that the supervisory channel does not take power in the nodes and it does not disturb the other channels. It is also possible for the supervisory channel to pass the inactive segment, which may be essential in the event of a fault and for line amplifier management.

FIGURES

PREFERRED EMBODIMENTS

Figure 1:
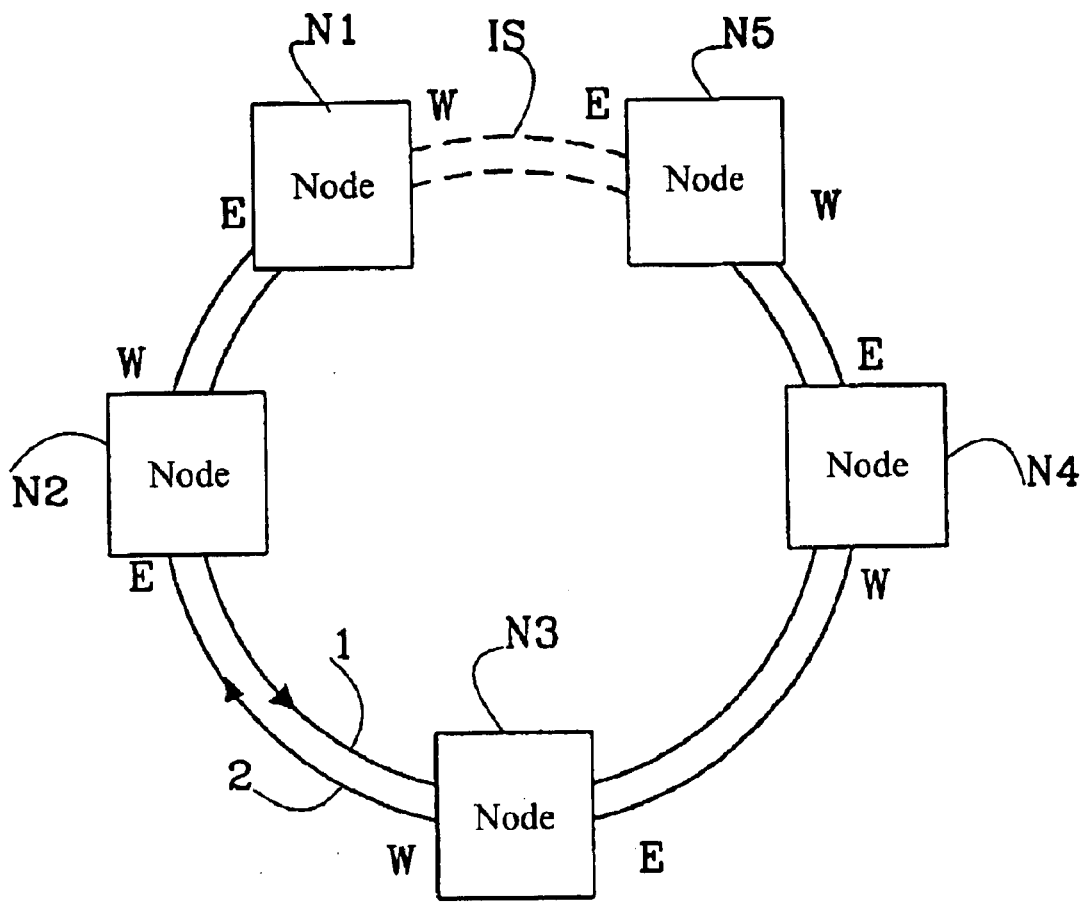
FIG. 1 shows a schematic overview of a ring network.

In FIG. 1 is shown an optical ring network using Wavelength Division Multiplexing, which will be called a "ring" for short. Five nodes N1, N2, N3, N4, N5 are connected to two optical fibres 1, 2 working in opposite directions, that is working as a bi-directional bus. Of course it is possible to have any number of nodes on the ring.

Data traffic and signalling from one node to another will be sent on both fibres 1, 2, that is in both directions.

However, between two of the nodes N1, N5, a segment of the ring, called an inactive segment IS, does not carry any data traffic, only signalling. This means that even though data traffic is sent on both fibres, a node will only receive data traffic from another node on one of the fibres. The nodes N1, N5 closest to the inactive segment IS will work as end-nodes. If a fault occurs in a segment on the ring that is not the inactive segment, then the inactive segment will be moved to encompass the fault.

The place where traffic enters the node from the first fibre 1 and leaves the node on the second fibre 2 will be called the west port W. The place where traffic enters the node from the second fibre 2 and leaves the node on the first fibre 2 will be called the east port E. The definition of "west" and "east" will be connected to this and nothing else, which means that in some figures west may be to the right of east. It could be helpful to picture the ring as the Equator.

Figure 2:
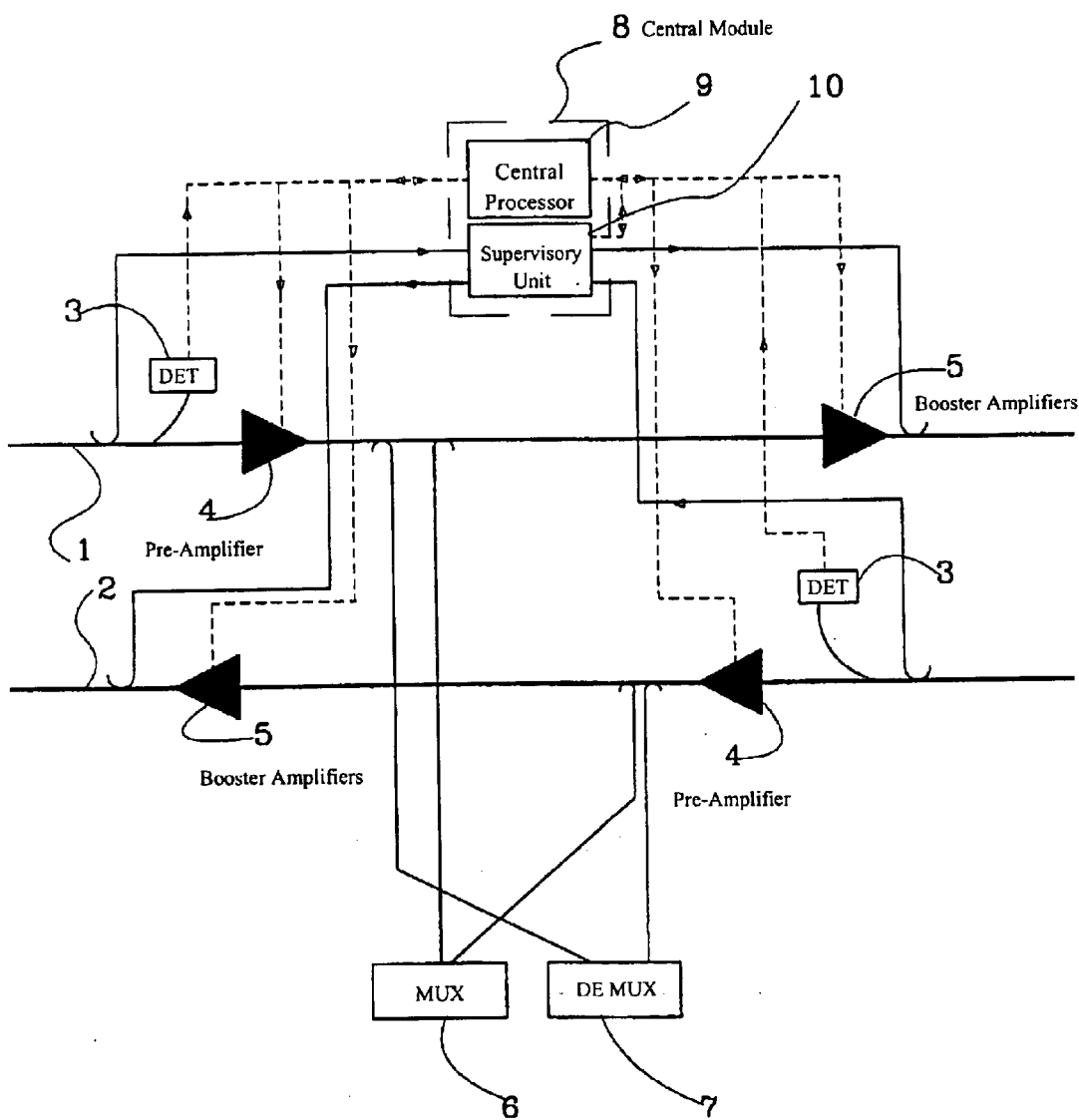
FIG. 2 shows a node according to the invention.

In FIG. 2 is shown a node according to the invention. On each fibre 1, 2 the node comprises a detector 3, a preamplifier 4, and a booster amplifier 5. The detector 3, which may comprise a PIN-diode, detects loss of incoming power. The preamplifiers 4 and the booster amplifiers 5 are preferably optical fibre amplifiers (OFA). The preamplifier works as a switch.

The node further comprises multiplexers 6 for adding wavelength channels to the fibres 1, 2 and demultiplexers 7 for dropping wavelength channels from the fibres 1, 2.

The node further comprises a central module 8, which in its turn comprises a central processor 9 and a supervisory unit 10. The central processor controls everything. The supervisory unit 10 sends a alarm signal ASSERT_PSS on both fibres 3, 4 in the payload in a separate supervisory channel OSC. According to the ITU-T standard draft G.mcs (Study group 15-contribution, Question: 16/15), the wavelength of the supervisory channel is preferably 1510 nm. Other wavelengths are of course possible.

An advantage with using 1510 nm is that the preamplifiers 4 preferably have a 1530 nm filter implemented to suppress the gain peak. This filter may be used to block the 1510 nm supervisory channel. This unnecessitates the use of a separate inline supervisory channel filter or an inline WDM coupler in the node. However, for the supervisory channel it could be advantageous of power saving reasons to use a WDM coupler inline.

The data traffic, that is the data communication channels, on the other hand, may for example use sixteen wavelengths centred around 1550 nm, with 100 GHz spacing.

The alarm signal ASSERT_PSS is a fault flag, which indicates whether there is a fault somewhere on the bus and is sent around the ring from node to node in both directions all the time. If the alarm signal ASSERT_PSS is set, thus indicating that there is a fault somewhere in the ring, there could optionally also be an indication in the supervisory channel OSC on which segment is inactive.

In a node there are also a number of flags or signals comprising:

POWER_W indicates power received at west port.

POWER_E indicates power received at east port.

PSD_W indicates incoming alarm signal at west port.

PSD_E indicates incoming alarm signal at east port.

ASSERT_PSS indicates state of local alarm signal.

BOFA_W indicates set state of west port booster amplifier 5.

BOFA_E indicates set state of east port booster amplifier 5.

POFA_W indicates set state of west port preamplifier 4.

POFA_E indicates set state of east port preamplifier 4.

AM_END is asserted if the node is an end-node.

PS_ACTIVE is asserted if automatic line protection is on.

The initial state of an intermediate node, that is not an end node would, if the line protection is on, be: POWER_W=TRUE, POWER_E=TRUE, PSD_W=FALSE, PSD_E=FALSE, ASSERT_PSS=FALSE, PS_ACTIVE=TRUE, BOFA_W=ENABLE, BOFA_E=ENABLE, POFA_W=ENABLE, POFA_E=ENABLE, AM_END=FALSE (1).

The initial state of an end-node with an inactive segment upon its west side would be the same as the intermediate node, but with POFA_W=DISABLE and AM_END=TRUE (2).

The initial state of an end-node with an inactive segment upon its east side would in a corresponding way be the same as the intermediate node, but with POFA E=DISABLE and AM_END=TRUE (3).

Hence, the preamplifiers 4 work as switches. When an inactive segment is wished the preamplifiers 4 are switched off and consequently no data traffic is received from the other end-node over the inactive segment. However, the supervisory channel OSC is transmitted onto the fibre 1, 2 after the booster amplifier 5 and received from the fibre 1, 2 before the preamplifier 4. Consequently, the supervisory channel OSC with its alarm signal ASSERT_PSS and possible other signalling is the only information that will pass the inactive segment IS.

Figure 3A:
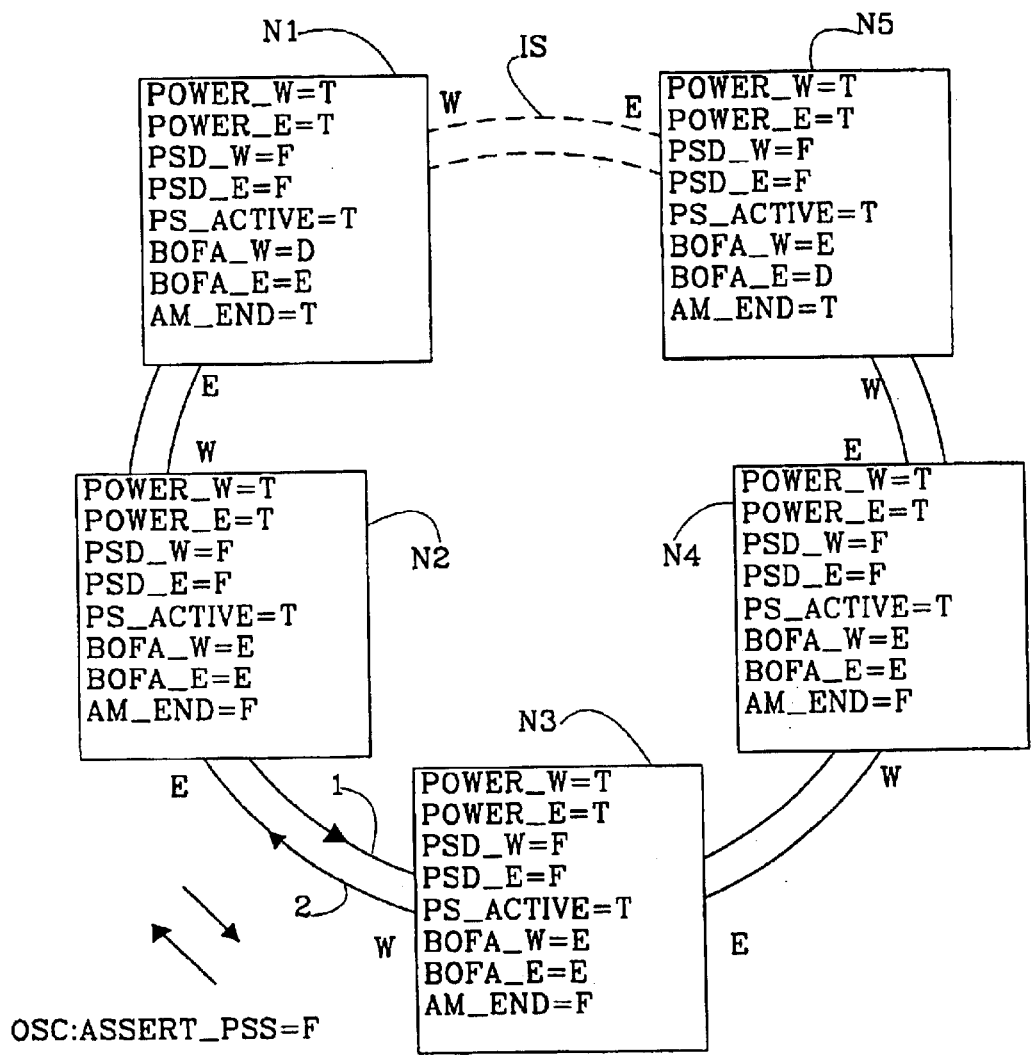
FIGS. 3a–3d show, according to the invention, the handling of an occurred fault in the ring network of FIG. 1.

In the FIGS. 3a–e will be shown an example on how to handle faults on the ring. FIG. 3a is the same as FIG. 1, but with the flags and signals indicated following (1), (2) and (3). To save space in the figure the following abbreviations is used: T=TRUE, F=FALSE, E=ENABLE and D=DISABLE.

In FIG. 3a everything is normal. The travelling alarm signal ASSERT_PSS has the status FALSE.

Figure 3B:
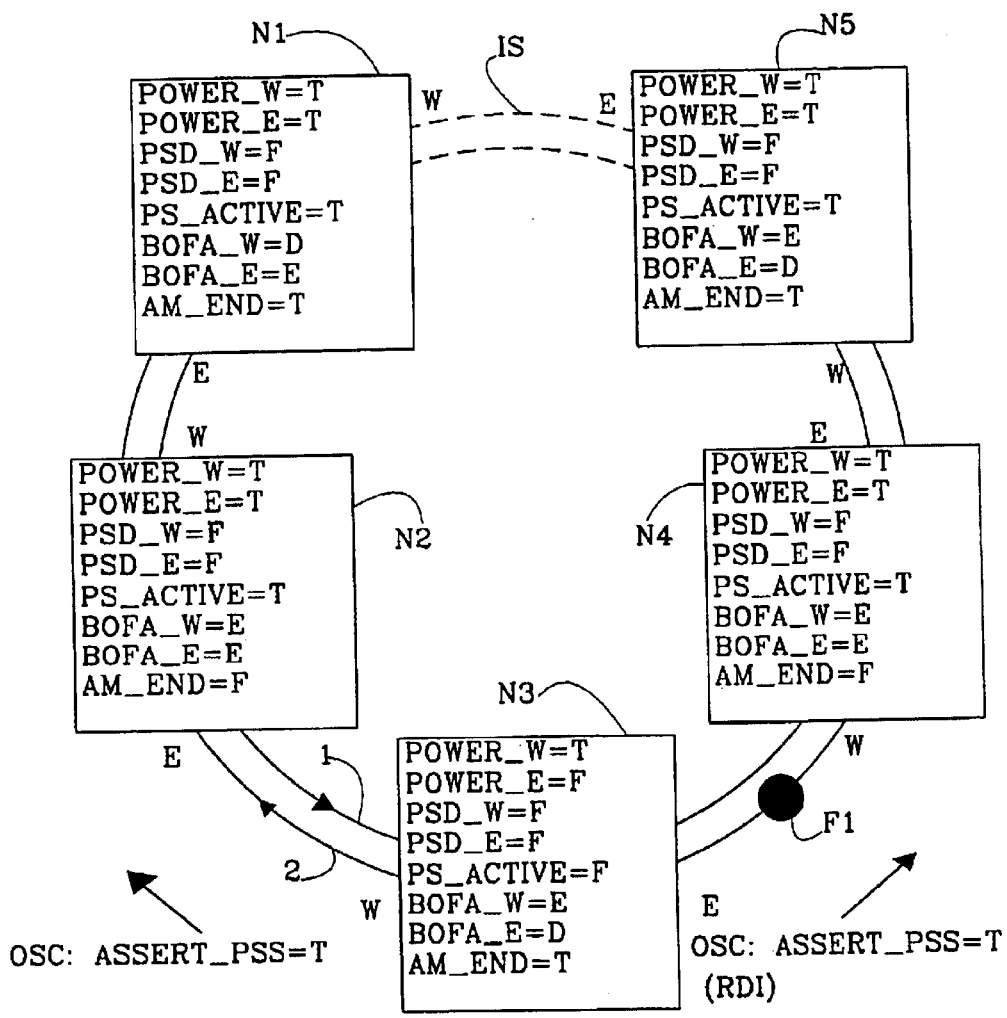

A fault F1 may occur for example on the second fibre 2 going from a fourth node N4 to a third node N3 see FIG. 3b. The third node N3 will detect the fault F1 due to loss of power, POWER_E=FALSE. Therefore, the local protection switching signal will be set, ASSERT_PSS=TRUE, and consequently the fault flag in the supervisory channel will be set, ASSERT_PSS=TRUE.

Since this fault handling only can take care of one fault at the time it must somehow be indicated that it is only permitted to move the inactive segment once. This is done with the flag PS_ACTIVE, which is set to FALSE when a fault is discovered. It may, of course, also be set to false if the wish is to inactivate the protection of another reason, for instance in the case of maintenance of the ring.

After the fault has been repaired the system manager sets the PS_ACTIVE flags in all the nodes to TRUE again. Hence, in FIG. 3b, in the third node N3 the automatic line protection is no longer on, PS_ACTIVE=FALSE.

Since an inactive segment is going to be created between the third node N3 and the fourth node N4, said nodes are going to become new end-nodes, thus the end-node flag in the third node N3 is asserted, AM_END=TRUE. The preamplifier and the booster amplifier towards the faulty side will be shut off in the third node N3, POFA_E=DISABLE, BOFA_E=DISABLE.

Figure 3C:
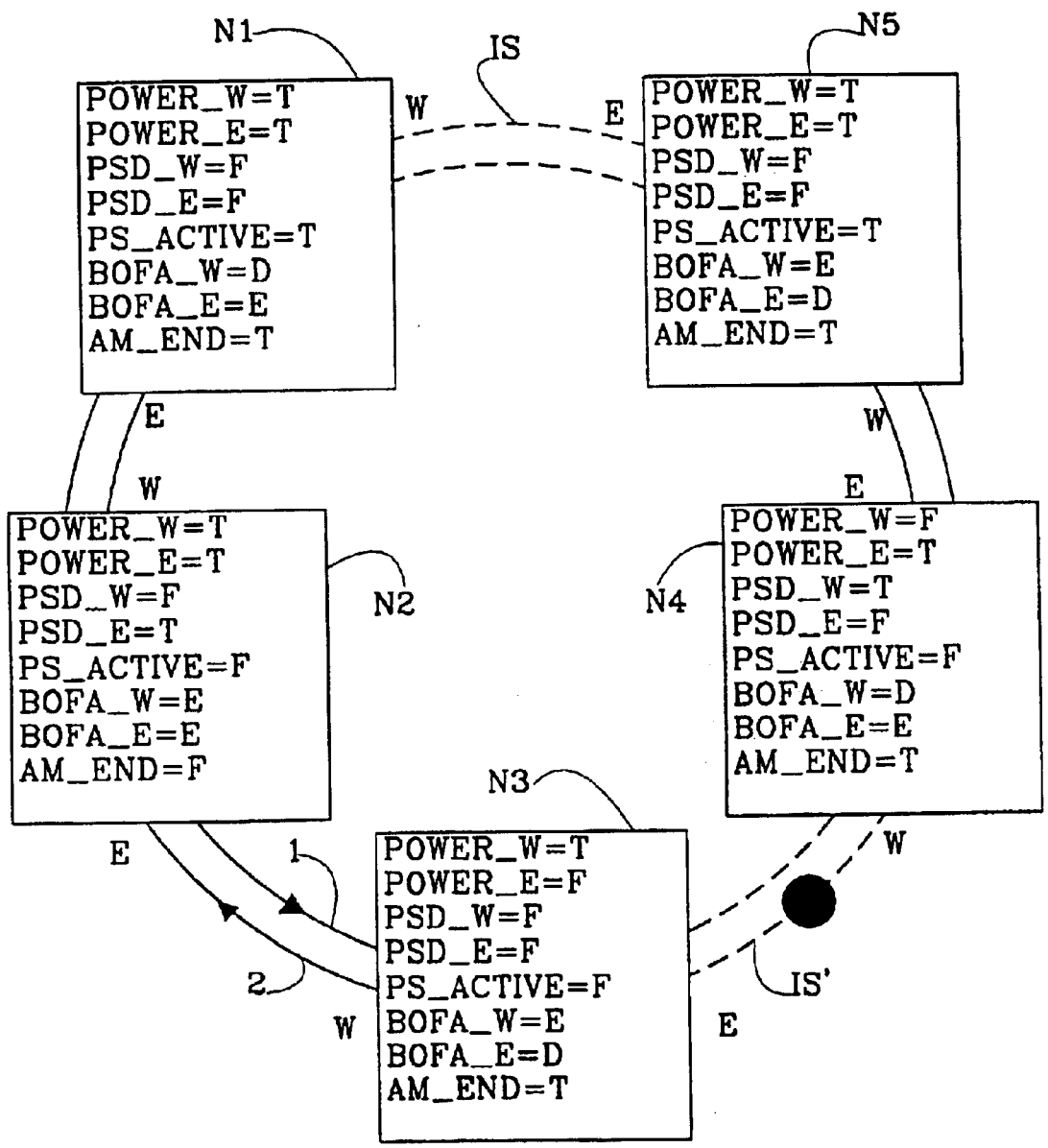

When said booster amplifier is shut off, see FIG. 3c, the fourth node N4 will detect loss of incoming power on that side, POWER_W=FALSE. The corresponding actions will then happen as just happened in the third node N3, POFA_W=DISABLE BOFA_W=DISABLE, ASSERT_PSS=TRUE, PS_ACTIVE=FALSE, AM_END=TRUE. Now there is an inactive segment IS' created between the third N3 and the fourth node N4.

Note that here is a redundancy. If, for some reason, the alarm signal ASSERT_PSS in the supervisory channel OSC would not have been set by the third node N3, it will be set by the fourth node N4.

The alarm signal ASSERT_PSS is sent from the third node N3 to the second node N2, from the second node N2 to the first node N1, from the first node N1 to the fifth node N5, from the fifth node N5 to the fourth node N4, from the fourth node N4 to the third node N3 (the last does not work in this case due to the fault) and the same in the opposite direction. This means that the news about the occurred fault will spread around the ring in both directions, which also gives redundancy.

As seen in FIG. 3c the second node N2 detects the change in the supervisory signal, PSD_E=TRUE. This causes an indication that automatic line protection no longer is on, PS_ACTIVE=FALSE.

The fourth node N4 also detects said alarm signal change, PSD_W=TRUE, which, as a redundancy, causes an indication that automatic line protection no longer is on, PS_ACTIVE=FALSE.

Figure 3D:
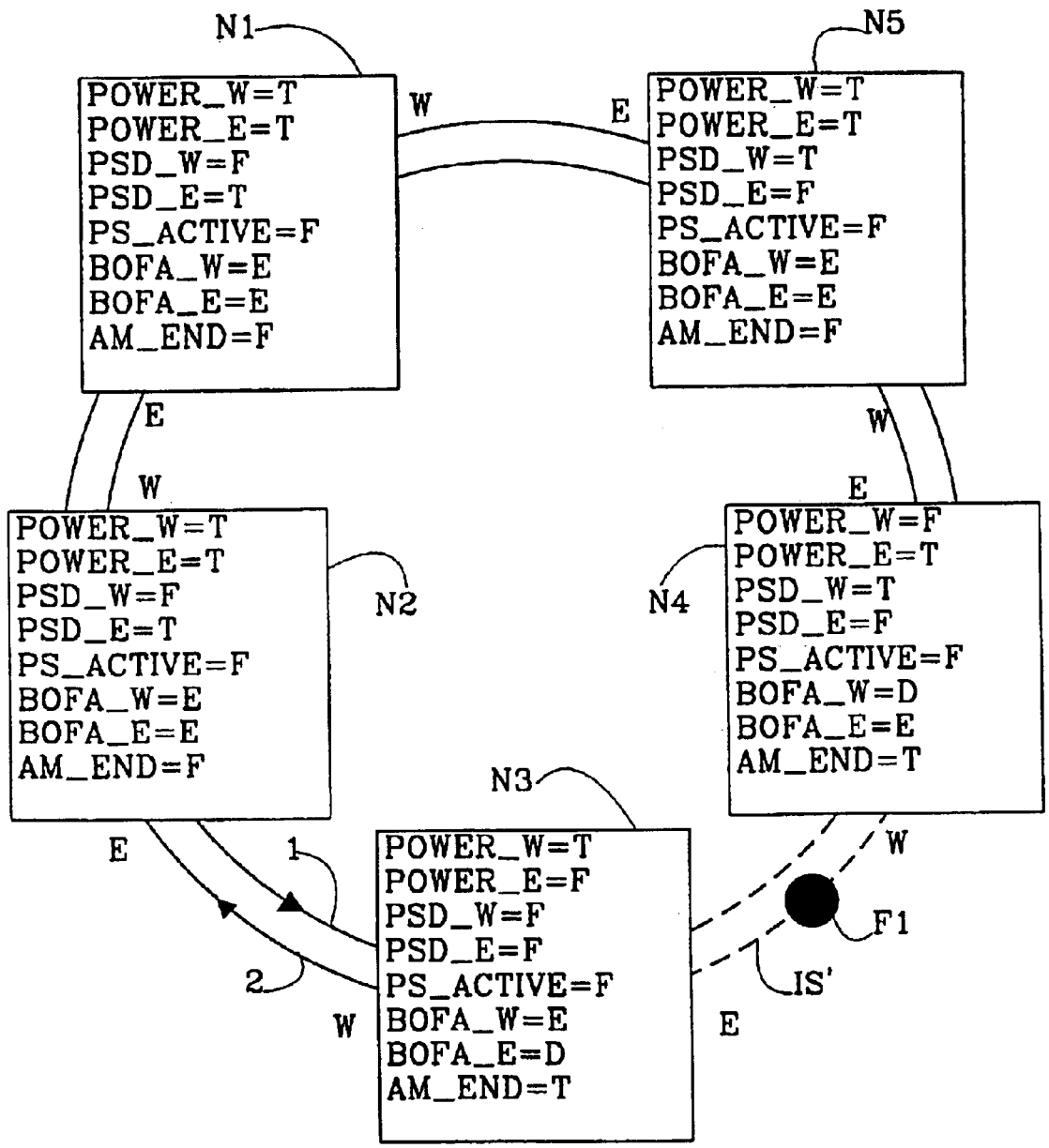

Further, in FIG. 3d, the first node N1, which is an old end-node and the fifth node N5, which is another old end-node, also detects the change in the supervisory signal, PSD_E=TRUE, PSD_W TRUE. This causes, as usual, an indication that automatic line protection no longer is on, PS_ACTIVE=FALSE.

This is also an indication that the first node N1 and the fifth node N5 no longer shall be end-nodes. Consequently, their preamplifiers towards the old inactive segment IS are turned on, POFA_W=ENABLE, POFA_E=ENABLE. Also their end-node indications are removed, AM_END=FALSE.

Traffic has now been restored. When repairs have been accomplished, a manager instructs the nodes to revert to normal operation, preferably still using the new end-nodes N3, N4 as end-nodes.

In the example above both of the old end-nodes N1, N5 learnt about the fault about the same time, but of course it will work as well if they do not. It is also to be remembered that the alarm signal ASSERT_PSS can pass an inactive segment, provided that there is no fault in it.

If a fault should occur between two nodes on both the fibres 1, 2 simultaneously it will work as well. Then the fault will be discovered simultaneously by both the nodes surrounding the fault.

If a fault should occur in a node, it will work in the same way as if the fault had occurred between two nodes. There will still be two nodes surrounding the fault.

If a fault should occur in a previously working inactive segment, the inactive segment will of course not be moved, since it is already at the right place. However, the other fault actions will take place, preventing the inactive segment to be moved if a second fault should occur somewhere else on the ring and reporting to the management that a fault has occurred.

It is possible to use additional flags in the supervisory channel. In the SDH world exists for example two flags that may be used: an alarm indicator signal AIS and a remote defect indicator RDI. The alarm indicator signal AIS may be sent to the next node upstream and the remote defect indicator RDI may be sent to the next node downstream if a fault is detected.

The booster amplifiers 5 are not really necessary. To make it cheaper they may be removed. In that case if a node detects loss of incoming power, said node sends out a remote defect indicator RDI, see FIG. 3b, to notify the node on the other side of the fault to shut off its preamplifier 4 etc. This can be used in cases with unidirectional fibre faults. It will probably also improve speed in the case where there is a booster amplifier to shut off.

Figure 4:
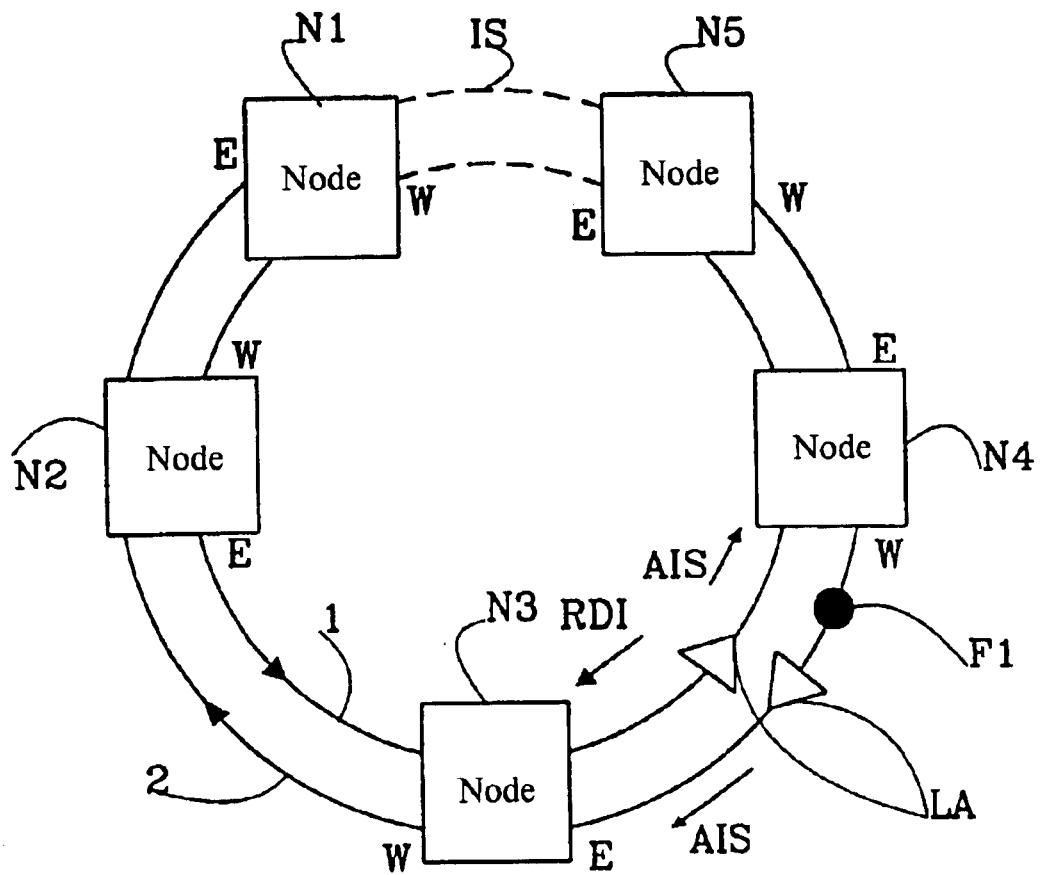
FIG. 4 shows the ring network of FIG. 1 with extra line amplifiers and improved fault handling.

Sometimes extra line amplifiers LA are used between the nodes, see FIG. 4. In that case, preferably both the alarm indicator signal AIS and the remote defect indicator RDI are used. Hence, the line amplifiers LA may tell the nodes on both sides that a fault has occurred.

As an alternative it is conceivable to use the booster amplifiers 5 to block transmission instead of using the preamplifiers 4 to block reception. There are, however, advantages of blocking reception, because then signals are present at the input of the shut off preamplifier. This means that a fault occurring in the present inactive segment may be detected by loss of power. It also means that the signals may be used to adjust the future amplification of the preamplifier, so that when the preamplifier is turned on it will have the correct amplification at once.

Conventional switches may also be used. It is, however, more economic and more reliable to use the amplifiers as switches, since then fewer items are necessary.

The communication paths discussed in this description have all the time been optical fibres. However, the concept may easily be translated to an electrical correspondence.

What is claimed is:

1. A self-healing communication network for transmitting information on channels, comprising: two communication paths (1, 2); at least two nodes (N1, N2, N3, N4, N5) connected by the communication paths, the nodes (N1, N2, N3, N4, N5) being arranged in a ring and the nodes (N1, N2, N3, N4, N5) and communication paths (1, 2) forming a bi-directional bus; a plurality of switching means (4, 5), one on each side of each node (N1, N2, N3, N4, N5), wherein a first node (N1) has a first switching means (4, 5) on one side (W) in an off position and a second node (N5) adjacent to the first node (N1) on the same side (E) as the first switching means (4, 5) has a second switching means (4, 5) on that same side in an off position, and every other switching means (4, 5) in an on position permitting transmission and reception of information; means (3, 10) for detecting a fault in the communication paths or in a node; and means (9) for switching, in response to detection of a fault, the node switching means (4, 5) that is in the off position to an on position and the node switching means (4, 5) in a node (N3, N4) adjacent to the fault and on the same side of the node as the fault to an off position, characterized in that the network comprises a separate supervisory channel (OSC) for transmitting information of the fault between the nodes (N1, N2, N3, N4, N5) of the network, in which supervisory channel (OSC) a fault flag (ASSERT_PSS) is provided for the indication of the fault.

2. A communication network according to claim 1, characterized in that the supervisory channel (OSC) also includes information on in which segment of the network the fault has occurred.

3. A communication network according to claim 1, characterized in that the first and second switching means (5) are blocking transmission.

4. A communication network according to claim 1, characterized in that the first and second switching means (4) are blocking reception.

5. A communication network according to claim 1, characterized in that the switching means are optical amplifiers (4, 5).

6. A communication network according to claim 1, characterized in that the switching means are switches.

7. A communication network according to claim 1, characterized in that the supervisory channel (OSC) is arranged to pass the nodes (N1, N2, N3, N4, N5, N6) outside the switching means (4, 5).

8. A communication network according to claim 1, characterized in that the supervisory channel (OSC) is arranged to pass the inactive segment (IS).

9. A method for fault handling in communication networks for transmitting information on channels, said network comprising two communication paths (1, 2) and at least two nodes (N1, N2, N3, N4, N5) connected by the communication paths (1, 2), the nodes (N1, N2, N3, N4, N5) being arranged in a ring and the nodes (N1, N2, N3, N4, N5) and communication paths (1, 2) forming a bi-directional bus, wherein a first node (N1) and a second node (N5) suppress transmission to and/or reception from a segment (IS) in the ring, called an inactive segment; characterized in the following steps:

a third node (N3), which may be the same as the first or the second node, detects a fault (F1), disables transmission and/or reception in the direction of the fault (F1) and sets a fault flag (ASSERT_PSS) in a separate supervisory channel (OSC), a fourth node (N4), which may be the same as the first or the second node, detects the fault (F1), disables transmission and/or reception in the direction of the fault and optionally sets the fault flag (ASSERT_PSS) in the supervisory channel (OSC), the first and second nodes (N1, N5) detect the fault (F1) by reading the fault flag (ASSERT_PSS) and enable transmission to and reception from the inactive segment (IS), wherein the inactive segment may be seen as moved to a segment (IS') between the third (N3) and the fourth node (N4).

10. A method for fault handling according to claim 9, characterized in that the nodes (N1, N2, N3, N4, N5, N6) includes switching means (4, 5) for the creation of the inactive segment (IS) and in that the supervisory channel (OSC) passes the nodes (N1, N2, N3, N4, N5, N6) outside said switching means (4, 5).

11. A method for fault handling according to claim 9 characterized in that the supervisory channel (OSC) passes the inactive segment (IS).

* * * * *